(12) United States Patent
Cattoen et al.

(10) Patent No.: US 9,607,221 B2
(45) Date of Patent: Mar. 28, 2017

(54) MONITORING SPACE USAGE IN A COMPUTER RACK

(71) Applicant: CA, INC., New York, NY (US)

(72) Inventors: Francois Cattoen, Paris (FR); Janne Koponen, Datchet (GB); Dhesikan Ananchaperumal, Framingham, MA (US)

(73) Assignee: CA, INC., New York, NY (US)

( * ) Notice: Subject to any disclaimer, the term of this patent is extended or adjusted under 35 U.S.C. 154(b) by 0 days.

(21) Appl. No.: 14/663,029

(22) Filed: Mar. 19, 2015

(65) Prior Publication Data
US 2016/0275351 A1 Sep. 22, 2016

(51) Int. Cl.
*G06K 9/00* (2006.01)
*G06K 9/62* (2006.01)

(52) U.S. Cl.
CPC ....... *G06K 9/00664* (2013.01); *G06K 9/6202* (2013.01)

(58) Field of Classification Search
None
See application file for complete search history.

(56) References Cited

U.S. PATENT DOCUMENTS

| 6,952,488 B2* | 10/2005 | Kelly | B66F 9/0755 382/104 |
|---|---|---|---|
| 8,533,601 B2* | 9/2013 | LaForest | H04L 41/22 715/735 |
| 9,324,000 B2* | 4/2016 | Mankovskii | G06K 9/3241 |
| 2006/0047466 A1* | 3/2006 | White | H05K 7/20836 702/130 |
| 2015/0254602 A1* | 9/2015 | Hammelbacher | G06Q 10/087 705/28 |
| 2016/0026888 A1* | 1/2016 | Mankovskii | G06T 7/602 382/103 |
| 2016/0277715 A1* | 9/2016 | Mankovskii | G06F 17/5004 |

OTHER PUBLICATIONS

Kondo (JP 2011-070617), translation included.*

* cited by examiner

*Primary Examiner* — Soo Jin Park
(74) *Attorney, Agent, or Firm* — Fabian VanCott; Steven Nichols (57) ABSTRACT

Monitoring space usage in a computer rack includes, with a computer, analyzing a number of mounting fixtures in an electronic image of a computer rack to determine a fixture mapping for the computer rack, with a computer, identifying, based on the electronic image and the fixture mapping, a number of computer systems in the computer rack to create a rack system map, and, with a computer, comparing the rack system map to data in an infrastructure management system to identify discrepancies.

20 Claims, 7 Drawing Sheets

| | |
|---|---|
| 310-1 Computer A | 320-1 Empty |
| 310-2 Empty | 320-2 Computer A |
| 310-3 Computer B | 320-3 Computer B |
| 310-4 Empty | 320-4 Empty |
| 310-5 Computer C | 320-5 Computer C |
| 310-6 Computer C | 320-6 Computer C |
| 310-7 Empty | 320-7 Empty |
| 310-8 Computer D | 320-8 Computer D |
| 310-9 Computer D | 320-9 Computer D |
| 310-10 Empty | 320-10 Empty |
| 310-11 Empty | 320-11 Empty |
| 310-12 Computer E | 320-12 Computer E |
| 310-13 Computer E | 320-13 Computer E |
| 310-14 Computer E | 320-14 Computer E |
| 310-15 Empty | 320-15 Empty |
| 310-16 Empty | 320-16 Computer F |
| 310-17 Empty | 320-17 Computer F |
| 310-18 Empty | 320-18 Computer F |
| 310-19 Empty | 320-19 Empty |
| 310-20 Empty | 320-20 Empty |
| 310-21 Empty | 320-21 Empty |
| 310-22 Empty | 320-22 Empty |
| 310-23 Empty | 320-23 Empty |
| 310-24 Empty | 320-24 Empty |
| 310-25 Empty | 320-25 Empty |
| 310-26 Empty | 320-26 Empty |

MONITORING SPACE USAGE IN A COMPUTER RACK

BACKGROUND

The present disclosure relates to monitoring computer equipment in a computer rack, and more specifically, monitoring the use of space by computer equipment in a computer rack.

A number of computing devices may be co-located in a room to allow for the common usage of electricity, network infrastructure, such a temperature control, and physical security. Technicians create a map of devices in the room to track the location of computer equipment. Over time, equipment may be moved between computer racks to facilitate changes in a computer room. The map may be updated manually as moves occur or as part of a request to move equipment.

BRIEF SUMMARY

According to one aspect of the present disclosure, a computer implemented method for monitoring space in a computer rack includes, with a computer, analyzing a number of mounting fixtures in an electronic image of a computer rack to determine a fixture mapping for the computer rack; with a computer, identifying, based on the electronic image and the fixture mapping, a number of computer systems in the computer rack to create a rack system map; and, with a computer, comparing the rack system map to data in an infrastructure management system to identify discrepancies.

According to another aspect of the present disclosure, A system for monitoring space used by computer systems in a computer rack includes a processor; memory to communicate with the processor; a computer display to receive output from the processor; a camera to output electronic images to the processor; and a rack space monitoring system to use the processor to execute modules. The rack space monitoring system includes: an acquiring module to acquire, from the camera, an electronic image of the computer rack; an analyzing module to analyze a number of mounting fixtures in the electronic image of the computer rack to determine a fixture mapping for the computer rack; an identifying module to identify, based on the electronic image and the fixture mapping, a number of computer systems in the computer rack to create a rack system map; a comparing module to compare the rack system map to data in an infrastructure management system to identify discrepancies; and a reporting module to report discrepancies.

According to still another aspect of the present disclosure, a computer program product for monitoring space used by computer systems in a computer rack includes a non-transitory computer readable storage medium with computer readable program code embodied therewith, where the computer readable program code includes program instructions that, when executed, cause a processor to: analyze a number of mounting fixtures in an electronic image of a computer rack to determine a fixture mapping for the computer rack; identify, based on the electronic image and the fixture mapping, a number of computer systems in the computer rack to create a rack system map; compare the rack system map to data in an infrastructure management system to identify discrepancies; and report discrepancies.

BRIEF DESCRIPTION OF THE DRAWINGS

Aspects of the present disclosure are illustrated by way of example and are not limited by the accompanying figures, with like references indicating like elements.

Throughout the drawings, identical reference numbers designate similar, but not necessarily identical, elements.

DETAILED DESCRIPTION

The present specification describes a method and system for monitoring space in a computer rack, such that an image of the computer rack is processed to monitor the location of computing devices in the computer rack.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Computing devices are co-located to provide ease in device management. A number of computing devices may be placed in an area called a data center. The number of computing devices may be organized in a data center or computer room using a number of computer racks. Each computer rack holds a number of computing devices and may provide support such as power or temperature control for the devices housed therein. Technicians create a map of devices in the room to track the location of computer equipment. The map may specify both the location of the rack and the location within that rack of all the devices. This allows devices to be physically located and accessed. Equipment may be moved between the computer racks to facilitate changes in a computer room. The map may be updated either manually as equipment is relocated or as part of a request to move equipment.

Due to the movement of devices, the map may become out of date. For example, a technician may fail to update the map to indicate the current location of a computing device. Alternatively, a request may fail to properly identify all equipment involved in a change. Thus, over time, the map becomes inaccurate. An inaccurate map of computing devices makes it difficult to locate computing devices when physical access is needed for maintenance, repair or replacement.

According to the principles described herein, a system monitors rack space usage by computing devices. The system analyzes an image of a computer rack to determine a fixture mapping, identifies a number of systems in the image based on the fixture mapping, and compares the rack system map to data in an infrastructure management system to identify discrepancies. The system may report, to an infrastructure management system, any discrepancies discovered. The map of computing devices may then be updated by providing an image to the rack space monitoring system.

As used in the present specification and in the appended claims, the term "display" refers to an electronic device used to present data. A display allows a computer system to share data with a user.

As used in the present specification and in the appended claims, the term "computing device" refers to an electronic machine for performing automatic calculations. The term computing device includes peripherals, such as a disk drive, associated with a central processing unit.

As used in the present specification and in the appended claims, the term "computer rack" refers to a device used to organize a number of computer devices. A computer rack allows a number of computing devices to be vertically stacked to preserve floor space and to organize the computing devices.

As used in the present specification and in the appended claims, the term "computing equipment" refers to equipment that is used in the operation of a computing device. Computing equipment includes equipment not communicatively connected to a computing device, such as a ventilation system.

As used in the present specification and in the appended claims, the term "mounting fixture" refers to a piece of equipment used to secure a computing device in a computer rack. A fixture may include a series of holes that are used to secure a computing device in a computer rack.

As used in the present specification and in the appended claims, the term "computer system" refers to a computer or computing device that is used to perform calculations and operations. A computer may include a processor, memory, and a number of interfaces. A computer system may include a number of peripheral devices, such as hard disk drives, as part of the computer system.

As used in the present specification and in the appended claims, the term "infrastructure management system" refers to a set of hardware, software, or both that is used to manage the physical location of computer systems.

Figure 1:
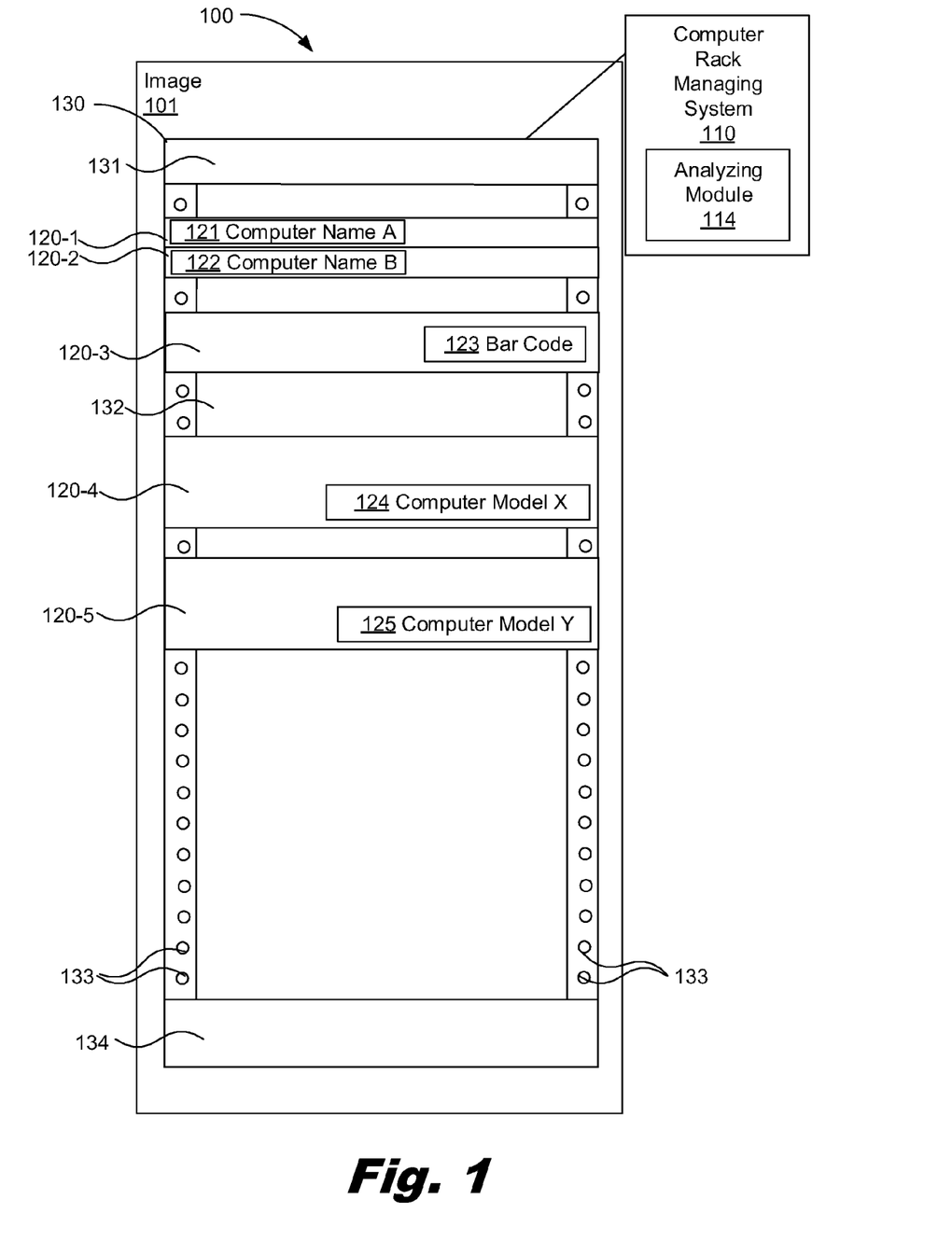
FIG. 1 illustrates a rack space monitoring system, according to one example of the principles described herein.

Referring now to the figures, FIG. 1 illustrates an example of a computer equipment monitoring system, according to one example of the principles described herein. The computer equipment monitor system includes a rack space monitoring system. The rack space monitoring system analyzes a number of mounting fixtures in an electronic image of a computer rack to determine a fixture mapping for the computer rack. The rack space monitoring identifies, based on the electronic image and the fixture mapping, a number of computer systems in the computer rack to create a rack system map. The rack space monitoring system compares the rack system map to data in an infrastructure management system to identify discrepancies.

As illustrated in FIG. 1. The system (100) includes a rack space monitoring system (110). The rack space monitoring system (110) monitors the use of space in a computer rack (130) by analyzing an image (101) of the computer rack (130). The computer rack (130) includes a number of cross bar elements (131, 134) to provide rigidity and support to organize a number of computer systems (120). The computer rack (130) has a number of mounting fixtures (133) to mount a number of computer systems (220). Different computer systems (120) may use a different number of mounting fixtures (133) to be mounted in a computer rack (130). The rack space monitoring system (110) monitors the positions of computing devices in a computer rack to create a rack system map. The rack space monitoring system (110) compares the rack system to data in an infrastructure management system to identify discrepancies.

The image (101) of the computer rack (130) shows a number of features of the computer rack (130). The computer rack (130) includes a number of cross members (131, 134) to maintain the width of the computer rack (130) and add rigidity to the computer rack (130). The computer rack (130) includes a number of mounting fixtures (133). The mounting fixtures (133) are spaced at regular intervals. Computer systems (120) may consume a number of mounting fixtures (133). The computer system 120-1 and the computer system 120-2 each consume one mounting fixture (133). The computer system 120-3 consumes two mounting fixtures (133). The computer system 120-4 and the computer system 120-5 each consume three rack mounting fixtures (133). The computer rack (130) has a number of empty spaces (132).

The rack space monitoring system (110) monitors, based on an image, space usage by a number of computer systems (120). The rack space monitoring system (110) compares the space usage by the computer systems (120) with data in an infrastructure management system.

As illustrated in FIG. 1, the system (100) includes a rack space monitoring system (110). The rack space monitoring system (110) analyzes an image (101) of a computer rack (130). The computer rack (130) supports a number of computer systems (120). The computer systems (120) are irregularly spaced. The computer systems (120) may obscure the view of a number of mounting fixtures (133). The image (101) may present an irregular view of the computer rack (130). An infrastructure management system maintains data describing the computer systems (120) in the computer rack (130). The data provides a technician with the location and details of computer systems (120). Over time, the data becomes inaccurate when a device is moved without updating data. A device may be added, removed, or relocated. Human error or incomplete processes may allow the data in the infrastructure management system to become inaccurate. The rack space monitoring system (110) monitors the space and identifies discrepancies with using data in the infrastructure management system.

The rack space monitoring system (110) analyzes a number of mounting fixtures (133) in an image (101) of a computer rack (130) to determine a fixture mapping for the computer rack (130). The analyzing may extrapolate information pertaining to the number of mounting fixtures (133). The analyzing determines where a mounting fixture (133) is, even when the mounting fixture (133) is not visible in the image (101). The fixture mapping provides information related to the mounting fixtures (133) that are used to mount computer systems (120).

The rack space monitoring system (110) identifies, based on the electronic image and the fixture mapping, a number of computer systems in the computer rack to create a rack system map. The rack space monitoring system (110) identifies the systems in the computer rack (130) based on visible characteristics in the image (101). The rack space monitoring system (110) may identify unique markings on a computing system (120). The rack space monitoring system (110) may identify a computer name (121, 122). The rack space monitoring system (110) may identify a computer system (120) by reading a unique bar code (123). The rack space monitoring system (110) may identify a computer system (120) based on other known unique identifiers. The rack space monitoring system (110) identifies a computer system (120) through non-unique characteristics. The rack space monitoring system (110) may identify a computer brand or model. A number of computer systems (120) are labelled with a computer model X (124) and a computer model Y (125). A computer system (120) may be matched with a number of non-unique characteristics to identify a computer system (120). The identification of a computer system (120) may be an estimation of identity by the rack space monitoring system (110).

The rack space monitoring system (110) compares the rack system map to data in an infrastructure management system to identify discrepancies. The comparison informs a technician when the data in the infrastructure management system is inaccurate. The technician may then correct the data or relocate the computing devices to the location specified by the data in the infrastructure management system.

Figure 2:
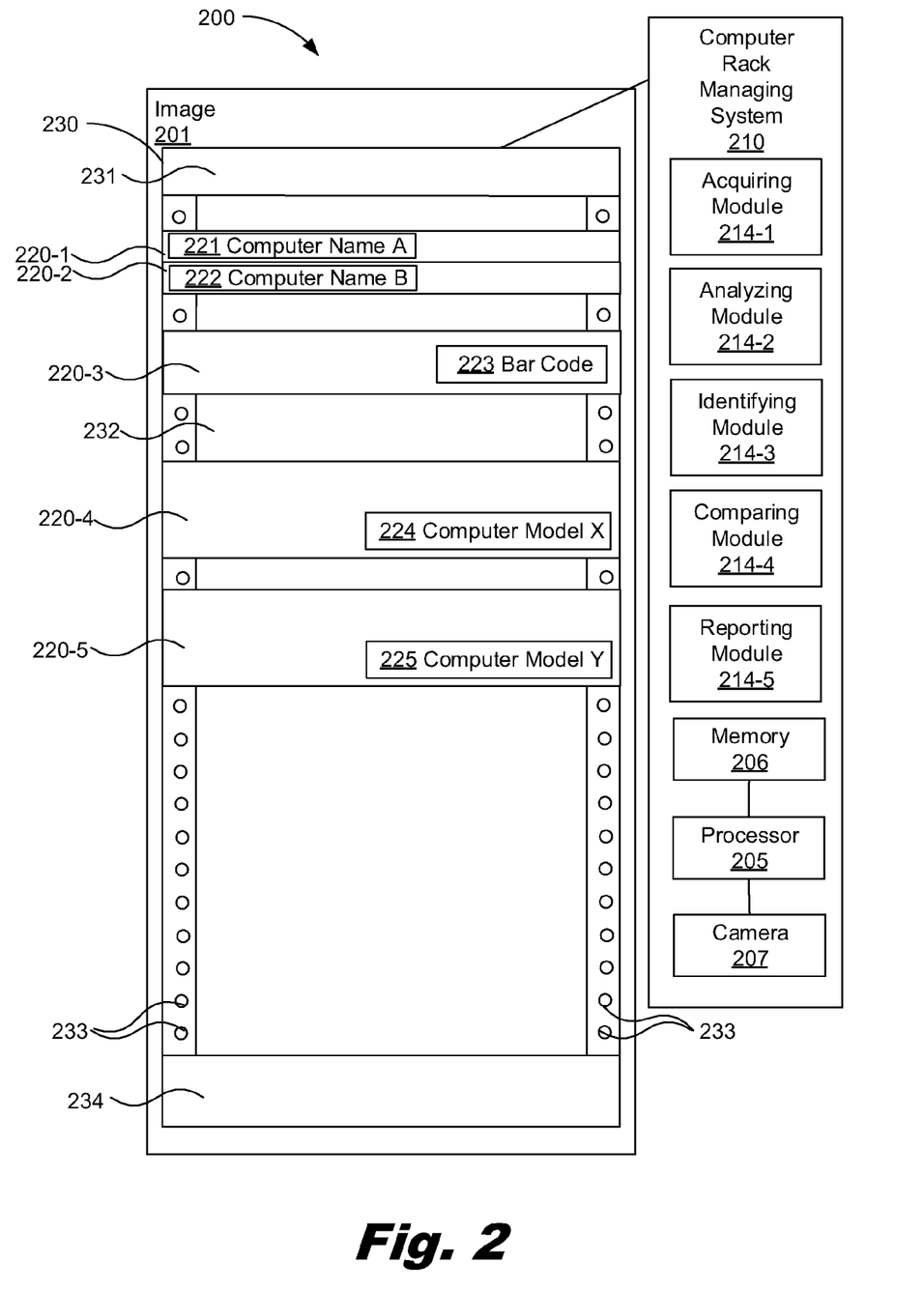
FIG. 2 illustrates a rack space monitoring system, according to one example of the principles described herein.

FIG. 2 illustrates an example of a computing device management system, according to one example of the principles described herein. The computing device management system includes a rack space monitoring system. The rack space monitoring operates on an image of a computer rack. The computer rack contains a number of computing devices. The rack space monitoring system acquires an electronic image of a computer rack, analyzes the image to create a fixture map of the computer rack, identifies a number of computer systems in the computer rack to create a rack system map, compares the rack system map with data in an infrastructure management system, and reports to an infrastructure management system a number of discrepancies.

As illustrated in FIG. 2, the system (200) includes a rack space monitoring system (210). The rack space monitoring system (210) may be a computer system that processes an image (201) of a computer rack (230). The rack space monitoring system (210) acquires, using a camera, an electronic image (201) of the computer rack (230). The rack space monitoring system (210) analyzes a number of mounting fixtures (233) in the electronic image (201) of the computer rack (230) to determine a fixture mapping for the computer rack (230). The rack space monitoring system (210) identifies, based on the electronic image (201) and the fixture mapping, a number of computer systems (220) in the computer rack (230) to create a rack system map. The rack space monitoring system (210) compares the rack system map to data in an infrastructure management system to identify discrepancies. The rack space monitoring system (210) reports, to an infrastructure management system, a number of discrepancies.

The rack space monitoring system (210) includes a processor (205), communicatively connected to memory (206). The rack space monitoring system (210) includes a camera (207) communicatively connected to the processor (207). The rack space monitoring system (210) includes a number of modules (214). The modules (214) refer to computer program code which, when executed by the processor (205), performs the designated function. As illustrated, the rack space monitoring system (210) includes an acquiring module (214-1), an analyzing module (214-2), an identifying module (214-3), a comparing module (214-4), and a reporting module (214-5).

The rack space monitoring system (210) includes an acquiring module (214-1), to acquire, using a camera (207) communicatively connected to the processor (205), an electronic image (201) of the computer rack (230). The camera (207) may provide a single image, or may provide a video image of the computer rack (230).

The rack space monitoring system (210) includes an analyzing module (214-2) to analyze a number of mounting fixtures (233) in the electronic image (201) of a computer rack (230) to determine a fixture mapping for the computer rack (230). The computer rack (230) has a number of mounting fixtures (233). The number of mounting fixtures (233) are regularly spaced, creating a number of spaces to place computer systems (220). The spacing allows the rack space management system (210) to calculate a number of rack spaces that may hold computer systems (220). Computer systems (220) occupy a number of rack spaces. A number of the mounting fixtures (233) are blocked from view by computer systems (220) mounted in the computer rack (230).

The rack space monitoring system (210) includes an identifying module (214-3), to identify, based on the electronic image (201) and the fixture mapping, a number of computer systems (220) in the computer rack (230) to create a rack system map. The identifying module (214-3) identifies a computer system (220) based on physical features of the computer system (220). The identifying module (214-3) may identify a unique feature on a computer system. A computer name (221, 222), bar code (223), or other unique features provide sufficient information to identify a computer system (220). The identifying module (214-3) identifies non-unique features, such as a computer model (224, 225). The identifying module (214-3) compares a computer system size and location with data stored in an information management system to identify the computer system (220). The identification of a computer system (220) may be an estimation of identity by the rack space monitoring system (210).

The rack space monitoring system (210) includes a comparing module (214-4), to compare the rack system map to data in an infrastructure management system to identify discrepancies. The infrastructure structure management system maintains data identifying a number of computer systems (220) in a computer rack (230). The rack space monitoring system (210) compares the actual position of the computer systems (220) in the computer rack (230) with the recorded position in the infrastructure management system to identify the discrepancies.

The rack space monitoring system (210) includes a reporting module (214-5), to report discrepancies to an infrastructure management system. The infrastructure management system may update the data in the infrastructure management system. The infrastructure management system may issue a warning to a user that the computer systems (220) are not in the correct position. The infrastructure management system may initiate a work order to have the computer system (220) location corrected.

FIG. 2 will now be described. The rack space monitoring system (210) acquires an image (201) of the computer rack (230) using the acquiring module (214-1). The image (201) is acquired through a camera (207), communicatively connected to the processor (205).

The analyzing module (214-2) analyzes the image (201) to identify a number of mounting fixtures (233) in the computer rack (230). The mounting fixtures (233) are at regular intervals to allow a variety of standardized hardware to use the computer rack (230). The mounting fixtures (233) create positions in the computer rack (230) where computer systems (220) may be mounted. The computer systems (220) obscure the view of a number of the mounting fixtures (233). The analyzing module (214-2) analyzes the image to determine where the mounting fixtures (233) are located. The analyzing module (214-2) identifies that the computer system 220-1 labelled computer name A (221) and the computer system 220-2 labelled computer name B (222) each cover a single mounting fixture (233). The analyzing module (214-2) identifies that the computer system 220-3 labelled with a bar code (223) covers two mounting fixtures (233). The computer system 220-4 labelled computer model X (224) and the computer system 220-5 labelled computer model Y (225) each cover three mounting fixtures (233). The analyzing module (214-2) creates a fixture map, mapping the locations of the mounting fixtures (233).

The identifying module (214-3) identifies the computer systems (220) present in the computer rack (230). The identifying module (214-3) identifies the computer system 220-1 based on the label computer name A (221). The identifying module (214-3) identifies the computer system 220-2 based on the label computer name B (222). The identifying module (214-3) identifies computer system 220-3 based on the bar code (223). The identifying module (214-3) identifies computer system 220-4 based on the label computer model X (224) and information in the infrastructure management system. The identifying module (214-3) identifies computer system 220-5 based solely on the label computer model Y (225). The identifying module (214-3) uses the mounting fixture map and the identification of computer systems (220) to create a rack system map.

The comparing module (214-4) compares the rack system map to data in an infrastructure management system to identify discrepancies. A discrepancy indicates that the rack system map and the infrastructure management system provide differing data as to the location of computer systems (220) in a computer rack (230). A discrepancy indicates that a technician who relies on the infrastructure management system may not be able to locate a computer system.

The reporting module (214-5) reports discrepancies to an infrastructure management system. The infrastructure management system may alter data in the infrastructure management system that records where a computer system is located. The infrastructure management system may notify a user of a discrepancy. The infrastructure management system may issue a work order to correct the discrepancy.

Figure 3:
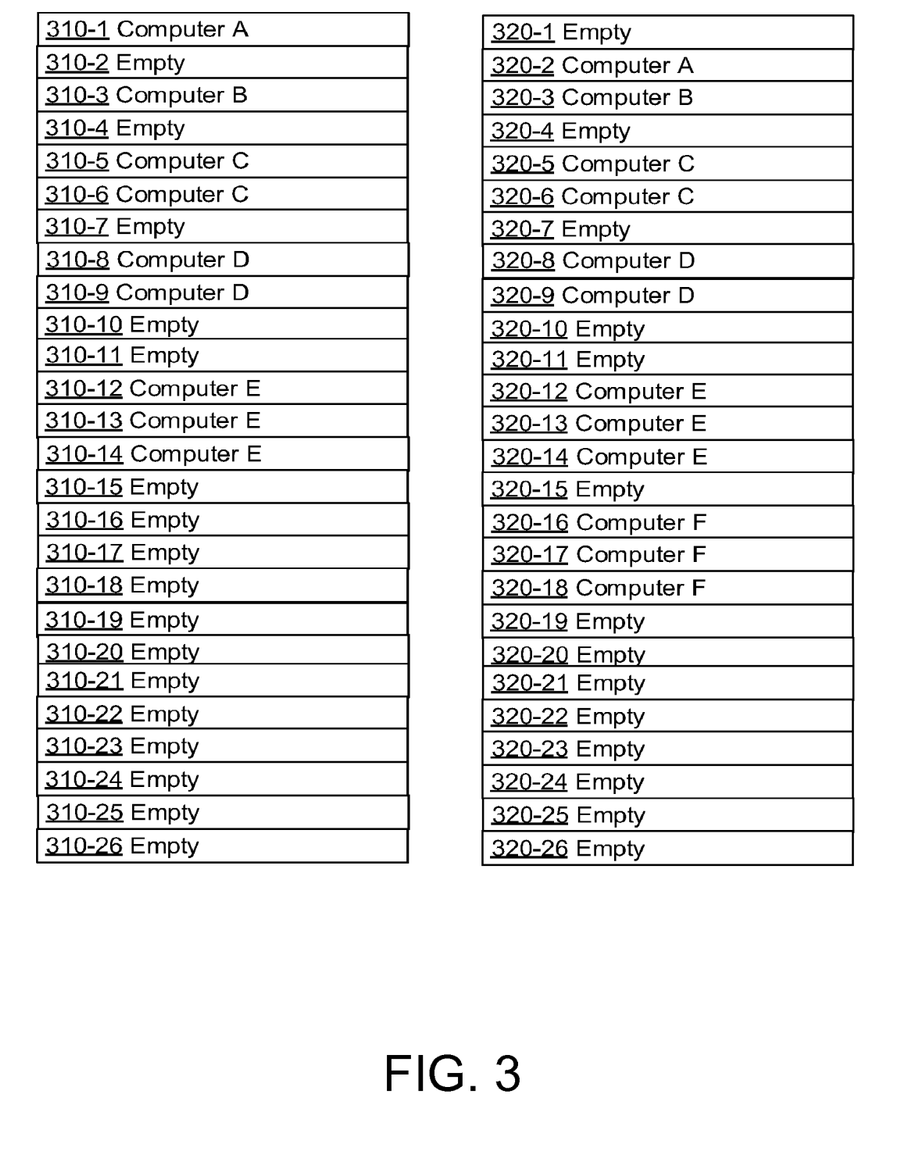
FIG. 3 illustrates an example of a number of system maps, according to one example of the principles described herein.

FIG. 3 illustrates an example of a number of system maps, according to one example of the principles described herein. The data stored in an infrastructure management system represents a management map (310) of a computer rack (FIG. 2, 230). A rack system map (320) shows the present location of systems in the computer rack (FIG. 2, 230). The comparing module (FIG. 2, 214-4) compares the management map (310) with the rack system map (320) to identify discrepancies.

As illustrated, the management map (310) shows that a first entry 310-1 contains computer A. The rack system map (320) shows that the second entry 320-2 contains computer A. This discrepancy is reported to the infrastructure management system. The management map (310) shows that the entries 310-16, 310-17, and 310-18 are empty. The rack system map (320) shows that the entries 320-16, 320-17, and 320-18 contain computer F. This discrepancy is reported to the infrastructure management system. A comparison of the other entries in the rack system map (320) and in the management map (310) does not identify any other discrepancies.

Figure 4:
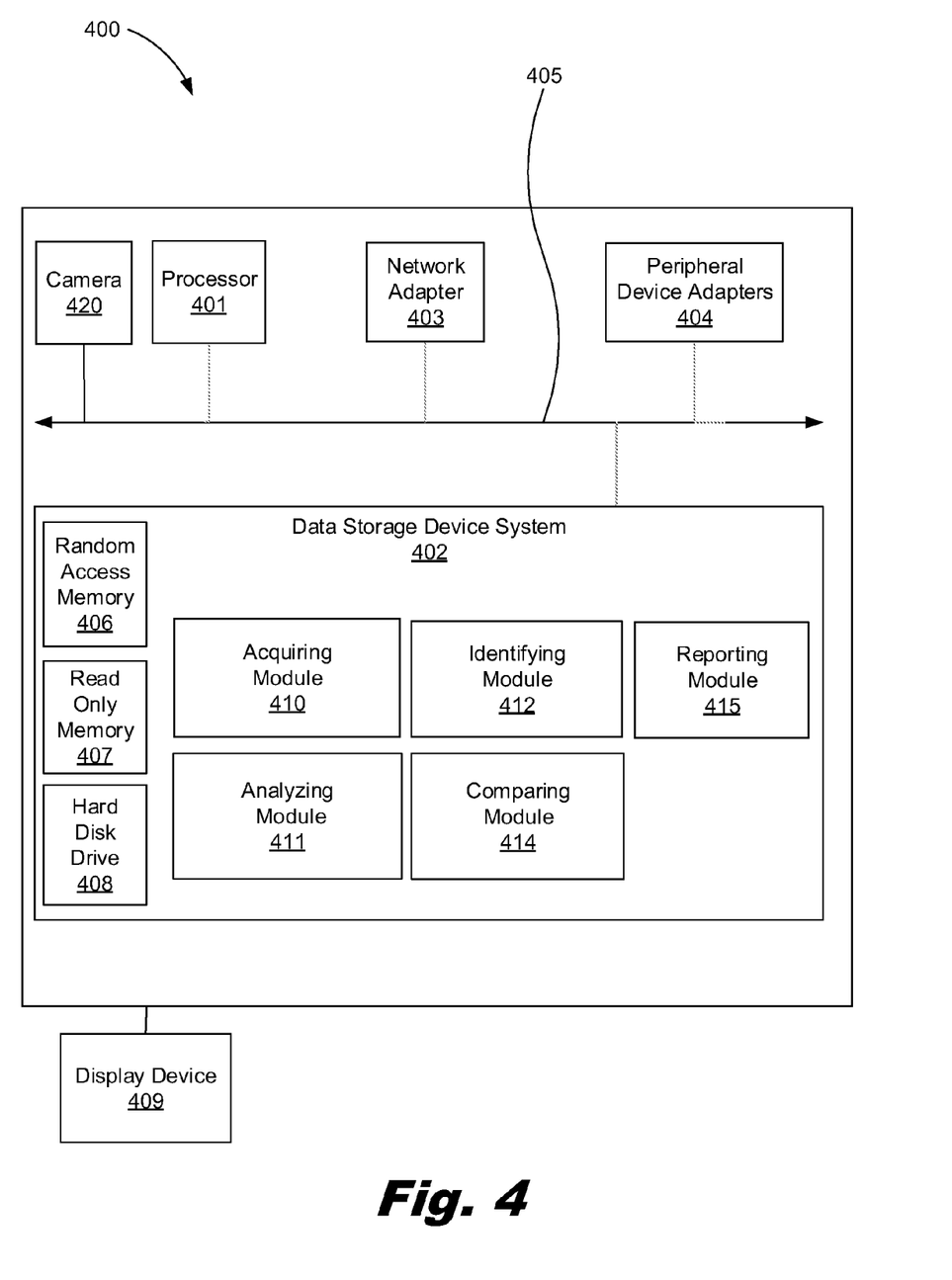
FIG. 4 illustrates a system monitoring space in a computer rack, according to one example of the principles described herein.

FIG. 4 illustrates an example of a system for monitoring computing equipment, according to the principles described herein. The computing device (400) for monitoring computing equipment may be implemented as an electronic device. Examples of electronic devices include servers, desktop computers, laptop computers, personal digital assistants (PDAs), mobile devices, smartphones, gaming systems, and tablets, among other electronic devices.

The computing device (400) may be utilized in any data-processing scenario, including stand-alone hardware, mobile applications, a computing network, or combinations thereof. Furthermore, the computer (400) may be used in a computing network, a public cloud network, a private cloud network, a hybrid cloud network, other forms of networks, or combinations thereof. In one example, the methods provided by the computing device (400) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies, or offered as a SaaS (Software as a service) that can be implemented on or off the cloud. In another example, the methods provided by the computing device (300) are executed by a local administrator.

To achieve its desired functionality, the computing device (400) may include various hardware components. Among these hardware components may be a number of processors (401), a number of data storage devices (402), a number of peripheral device adapters (404), and a number of network adapters (403). These hardware components may be interconnected through the use of a number of buses and/or network connections. In one example, the processor (401), data storage device (402), peripheral device adapters (404), and a network adapter (403) may be communicatively coupled via a bus (405).

The data storage device (402) may store data, such as executable program code, that is executed by the processor (401) or other processing device. As will be discussed, the data storage device (402) may specifically store computer code representing a number of applications that the processor (401) executes to implement at least the functionality described herein.

The data storage device (402) may include various types of memory modules, including volatile and nonvolatile memory. For example, the displaying system (302) of the present example includes Random Access Memory (RAM) (406), Read Only Memory (ROM) (407), and Hard Disk Drive (HDD) memory (408). Many other types of memory may also be utilized, and the present specification contemplates the use of as many varying type(s) of memory in the data storage device (402) as may suit a particular application of the principles described herein. In certain examples, different types of memory in the data storage device (402) may be used for different data storage needs. For example, in certain examples, the processor (401) may boot from Read Only Memory (ROM) (407), maintain nonvolatile storage in the Hard Disk Drive (HDD) memory (408), and execute program code stored in Random Access Memory (RAM) (406).

Generally, the data storage device (402) may comprise a computer readable medium, a computer readable storage medium, or a non-transitory computer readable medium, among others. For example, the data storage device (402) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (403, 404) in the computing device (400) enable the processor (401) to interface with various other hardware elements, external and internal to the computing device (400). For example, the peripheral device adapters (404) may provide an interface to input/output devices, such as, for example, a display device (409), a mouse, or a keyboard. The peripheral device adapters (403) may also provide access to other external devices, such as an external storage device, a number of network devices such as, for example, servers, switches, and routers, client devices, other types of computing devices, and combinations thereof.

The display device (409) may be provided to allow a user of the computing device (400) to interact with and implement the functionality of the computing device (400). The peripheral device adapters (404) may also create an interface between the processor (401) and the display device (409), a printer, or other media output devices. The network adapter (403) may provide an interface to other computing devices within, for example, a network, thereby enabling the transmission of data between the computing device (400) and other devices located within the network.

The computing device (400) may, when executed by the processor (401), display the number of graphical user interfaces (GUIs) on the display device (409) associated with the executable program code, representing the number of applications stored on the data storage device (402). The GUIs may include aspects of the executable code, including displaying a number of messages to a user. The GUIs may display the special relationships of a number of computer systems in a computer rack. The GUIs may display, for example, a message indicating a system is incorrectly positioned in a computer rack. Examples of display devices (409) include a computer screen, a laptop screen, a mobile device screen, a personal digital assistant (PDA) screen, and a tablet screen, among other display devices (409). Examples of the GUIs displayed on the display device (409) will be described in more detail below.

The computing device (400) may include a number of modules used in the implementation of the management system for data in a distributed environment. The various modules within the computing device (400) comprise executable program code that may be executed separately. In this example, the various modules may be stored as separate computer program products. In another example, the various modules within the computing device (300) may be combined within a number of computer program products; each computer program product comprising a number of the modules.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (401) of the computing device (400) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The acquiring module (410) acquires, using the camera (420) communicatively connected to the processor, an electronic image of the computer rack. The electronic image provides information to the system about a computer rack.

The analyzing module (411) analyzes a number of mounting fixtures in the electronic image of the computer rack to determine a fixture mapping for the computer rack. The fixture mapping identifies a number of locations where a computer system may be mounted in the computer rack.

The identifying module (412) identifies, based on the electronic image and the fixture mapping, a number of computer systems in the computer rack, to create a rack system map. The identifying module (412) uses physical characteristics of the computer systems to identify the computer systems.

The comparing module (414) compares the rack system map to data in an infrastructure management system to identify discrepancies between the rack system map and the data in the infrastructure management system. Discrepancies indicate a difference between the rack system map and the data in the infrastructure management system.

The reporting module (415) reports discrepancies to the infrastructure management system. The infrastructure management system may automatically correct discrepancies.

The infrastructure management system may inform a user of discrepancies. The infrastructure management system may initiate action to correct the discrepancies.

Figure 5:
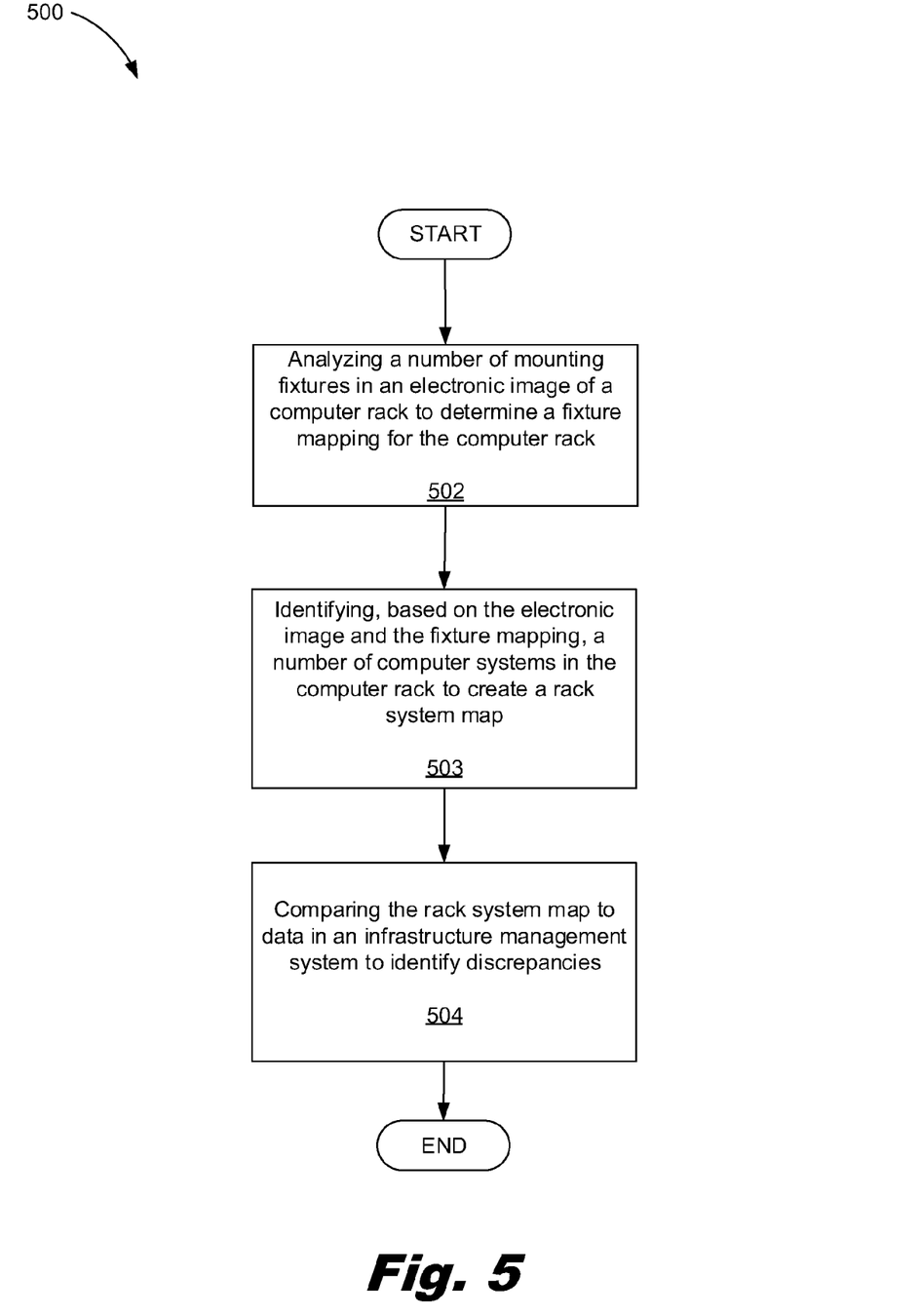
FIG. 5 illustrates a flowchart of a method implemented by a rack space monitoring system, according to one example of the principles described herein.

FIG. 5 is a flowchart of a method for monitoring a computing device, according to one example of the principles described herein. The method (500) may be executed by the system of FIG. 1. The method (500) may be executed by other systems (i.e. system 200, system 400, system 700). As illustrated, the method (500) includes analyzing (block 502) a number of mounting fixtures in an electronic image of a computer rack to determine a fixture mapping for the computer rack, identifying (block 503), based on the electronic image and the fixture mapping, a number of computer systems in the computer rack to create a rack system map, and comparing (block 504) the rack system map to data in an infrastructure management system to identify discrepancies.

As mentioned above, the method (500) includes analyzing (block 502) a number of mounting fixtures in an electronic image of a computer rack to determine a fixture mapping for the computer rack. The mounting fixtures are used to mount computer systems in a computer rack. The fixture mapping identifies positions in the computer rack where a computer system may be mounted.

As mentioned above, the method (500) includes identifying (block 503), based on the electronic image and the fixture mapping, a number of computer systems in the computer rack to create a rack system map. The identifying (block 503) uses physical characters of the computer systems to identify the computer systems. The identifying (block 503) may compare the physical characteristics of a computer system with data stored in the infrastructure management system to identify a computer system.

As mentioned above, the method (500) includes comparing (block 504) the rack system map to data in the infrastructure management system to identify discrepancies between the rack system map and the data in the infrastructure management system. The discrepancies identify computer systems that are inaccurately recorded, and likely to be challenging for a technician to locate based on the data in the infrastructure management system.

Figure 6:
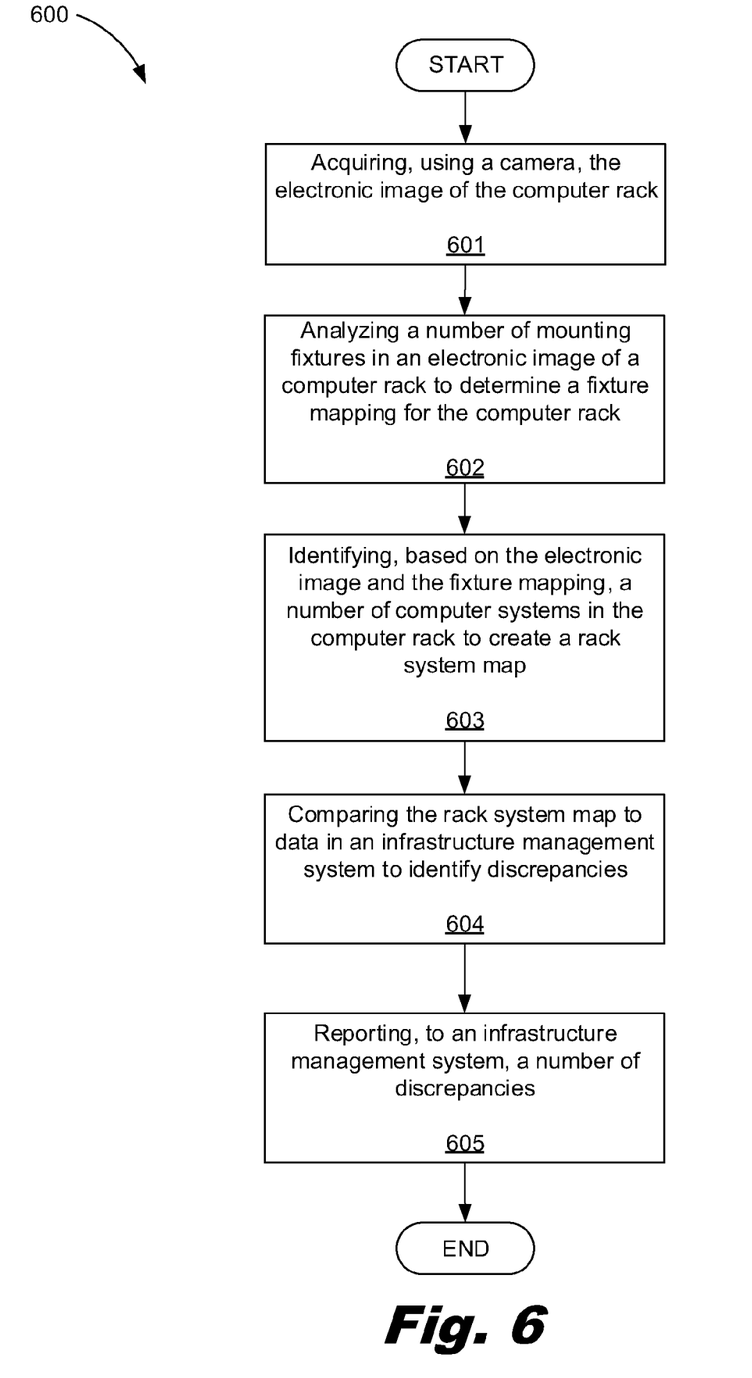
FIG. 6 illustrates a flowchart of a method implemented by a rack space monitoring system, according to one example of the principles described herein.

FIG. 6 is a flowchart of a method for monitoring a computing device, according to one example of the principles described herein. The method (600) may be executed by the system of FIG. 1. The method (600) may be executed by other systems (i.e. system 200, system 400, system 700). As illustrated, the method (600) includes acquiring (block 601), using a camera, the electronic image of the computer rack, analyzing (block 602) a number of mounting fixtures in an electronic image of a computer rack to determine a fixture mapping for the computer rack, identifying (block 603), based on the electronic image and the fixture mapping, a number of computer systems in the computer rack to create a rack system map, comparing (block 604) the rack system map to data in an infrastructure management system to identify discrepancies, and reporting (block 605), to an infrastructure management system, a number of discrepancies.

As mentioned above, the method (600) includes acquiring (block 601), using a camera, an electronic image of a computer rack. The camera may be a part of the system, or may be communicatively connected to the system. The system operates the camera to acquire an electronic image of the computer rack.

As mentioned above, the method (600) includes analyzing (block 602) a number of mounting fixtures in the electronic image of a computer rack to determine a fixture mapping for the computer rack. As mentioned above, the method (600) identifies (block 603), based on the electronic image and the fixture mapping, a number of computer systems in the computer rack to create a rack system map. As mentioned above, the method (600) compares (block 604) the rack system map to data in an infrastructure management system to identify discrepancies.

As mentioned above, the method (600) includes reporting (block 605), to an infrastructure management system, a number of discrepancies. The report initiates remedial action to correct the number of discrepancies.

Figure 7:
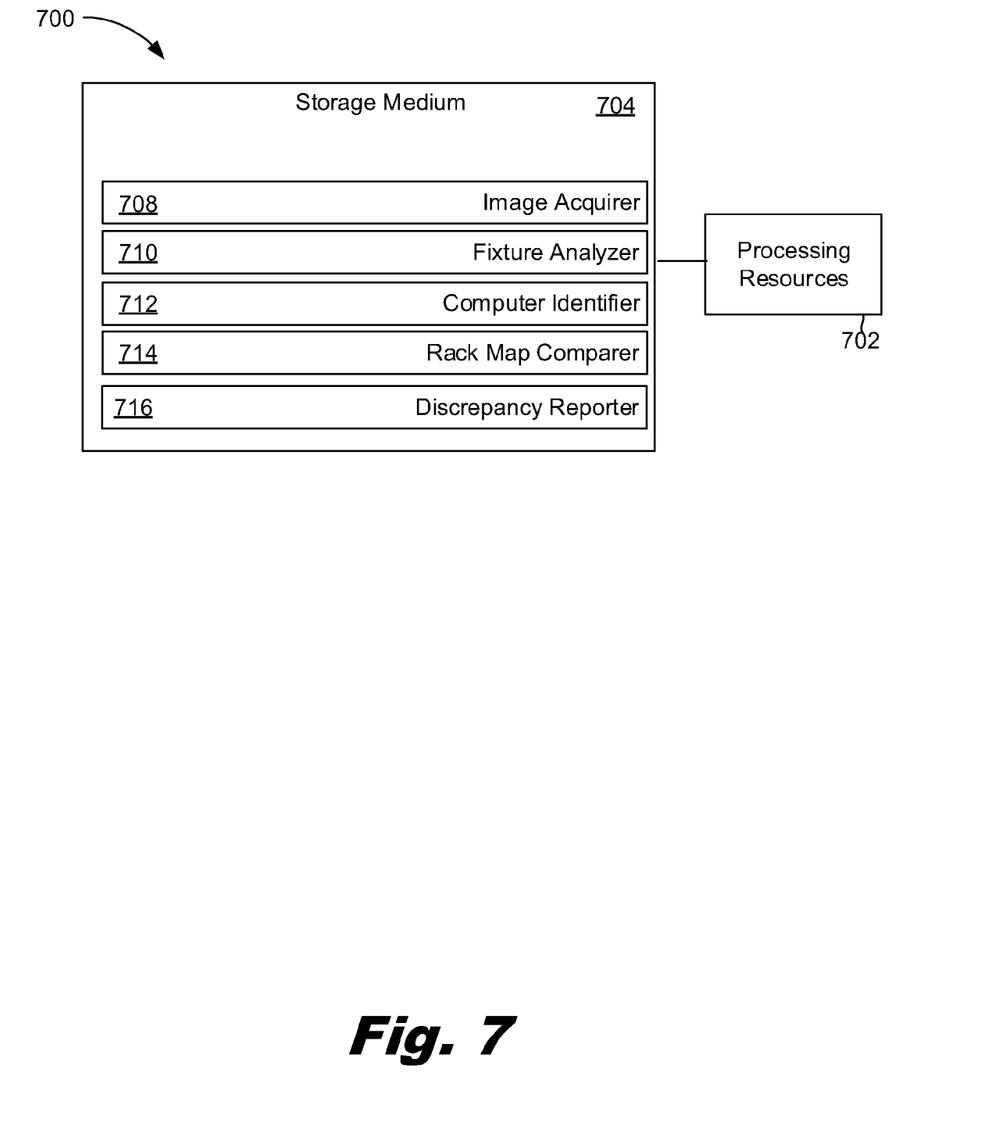
FIG. 7 illustrates a diagram of a system for monitoring rack space, according to one example of the principles described herein.

FIG. 7 is a diagram of a rack space monitoring system (700) according to one example of the principles described herein. The rack space monitoring system (700) includes processing resources (702) that are in communication with memory resources (704). The processing resources (702) include at least one processor and other resources used to process programmed instructions. The memory resources (704) generally represent any memory capable of storing data, such as programmed instructions or data structures to be used by the rack space monitoring system (700). The programmed instructions shown stored in the memory resource (704) include an image acquirer (708), a fixture analyzer (710), a computer identifier (712), a rack map comparer (714), and a discrepancy reporter (716).

The image acquirer (708) represents programmed instructions that, when executed, cause the processing resource (702) to acquire, using a camera, the electronic image of the computer rack.

The fixture analyzer (710) represents programmed instructions that, when executed, cause the processing resource (702) to analyze a number of mounting fixtures in an electronic image of a computer rack, to determine a fixture mapping for the computer rack.

The computer identifier (712) represents programmed instructions that, when executed, cause the processing resource (702) to identify, based on the electronic image and the fixture mapping, a number of computer systems in the computer rack to create a rack system map.

The rack map comparer (714) represents programmed instructions that, when executed, cause the processing resource (702) to compare the rack system map to data in an infrastructure management system to identify discrepancies.

The discrepancy reporter (716) represents programmed instructions that, when executed, cause the processing resource (702) to report, to an infrastructure management system, a number of discrepancies.

The rack space monitoring system (700) of FIG. 7 may be part of a general purpose computer. The rack space monitoring system (700) of FIG. 7 may be part of a mobile device, such as a mobile telephone. However, in alternative examples, the rack space monitoring system (700) is part of an application specific circuit.

The flowchart and block diagrams in the Figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. It will be understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A computer implemented method for monitoring space in a computer rack, the method comprising:
    with a computer, analyzing a number of mounting fixtures in an electronic image of a computer rack to determine a fixture mapping for the computer rack, wherein each mounting fixture includes a series of holes that are used to secure a computing device in the computer rack;
    with a computer, identifying, based on the electronic image and the fixture mapping, a number of computer systems in the computer rack to create a rack system map; and
    with a computer, comparing the rack system map to data in an infrastructure management system to identify discrepancies.

2. The method of claim 1, wherein the computer is incorporated in a mobile phone with a camera to generate the electronic image of the computer rack.

3. The method of claim 1, further comprising, with a computer, reporting, to the infrastructure management system, a number of discrepancies.

4. The method of claim 1, further comprising extrapolating information pertaining to the number of mounting fixtures to determine where a number of mounting fixtures are located that are not visible in the electronic image.

5. The method of claim 1, wherein identifying the number of computer systems in the computer rack comprises identifying the number of computer systems, based on visible characteristics of each of the computer systems in the electronic image.

6. The method of claim 1, further comprising, for each of the number of computer systems in the computer rack, identifying a corresponding computer brand or model based on non-unique markings associated with that computer system.

7. The method of claim 5, wherein identifying the number of computer systems in the computer rack comprises identifying each of the number of computer systems based on physical features of each computer system.

8. A system for monitoring space used by computer systems in a computer rack, the system comprising:
    a processor;
    memory to communicate with the processor;
    a computer display to receive output from the processor;
    a camera to output electronic images to the processor; and
    a rack space monitoring system to use the processor to execute modules, the rack space monitoring system comprising:
        an acquiring module to acquire, from the camera, an electronic image of the computer rack;
        an analyzing module to analyze a number of mounting fixtures in the electronic image of the computer rack to determine a fixture mapping for the computer rack, each mounting fixture includes a series of holes that are used to secure a computing device in the computer rack;
        an identifying module to identify, based on the electronic image and the fixture mapping, a number of computer systems in the computer rack to create a rack system map;
        a comparing module to compare the rack system map to data in an infrastructure management system to identify discrepancies; and
        a reporting module to report discrepancies.

9. The system of claim 8, the identifying module to identifying each of the number of computer systems based on unique markings associated with a corresponding computer system.

10. The system of claim 9, wherein the unique markings comprise a computer name label.

11. The system of claim 9, wherein the unique markings comprise a bar code.

12. The system of claim 8, the identifying module to identify each of the number of computer systems based on physical features of a corresponding computer system visible in the electronic image.

13. The system of claim 8, further comprising an optimizing module to optimize the rack system map according to space usage.

14. A computer program product for monitoring space used by computer systems in a computer rack, the computer program product comprising:
    a non-transitory computer readable storage medium, said computer readable storage medium comprising computer readable program code embodied therewith, said computer readable program code comprising program instructions that, when executed, cause a processor to:
    analyze a number of mounting fixtures in an electronic image of a computer rack to determine a fixture mapping for the computer rack;
    identify, based on the electronic image and the fixture mapping, a number of computer systems in the computer rack to create a rack system map, including determining from the electronic image of the computer rack whether one or more of the computer systems is covering one or more of the mounting fixtures;
    compare the rack system map to data in an infrastructure management system to identify discrepancies; and
    report discrepancies.

15. The product of claim 14, further comprising computer program code to, when executed, cause the processor to estimate an identity of a computer system in the computer rack when the identity of that computer system cannot be determined from the electronic image of the computer rack.

16. The product of claim 14, wherein the computer readable program code to analyze the number of mounting fixtures in the electronic further extrapolates a location of a mounting fixtures in the computer rack that are not visible in the electronic image.

17. The product of claim 14, wherein the computer readable program code to identify, based on the electronic image and the fixture mapping, the number of computer systems in the computer rack to create the rack system map identifies each of the number of computer systems based on known features of each of the computer systems.

18. The product of claim 14, wherein the report of discrepancies comprises a work order to have a location of a corresponding computer system corrected.

19. The product of claim 18, wherein the computer readable program code to identify, based on the electronic image and the fixture mapping, the number of computer systems in the computer rack to create a rack system map identifies each of the number of computer systems based on physical features of a corresponding model of the computer system.

20. The product of claim 14, further comprising computer program code to, when executed, cause the processor to optimize the rack system map according to space usage.

* * * * *